United States Patent
Nelson

[15] 3,653,405
[45] Apr. 4, 1972

[54] FLUID LINE COUPLER

[72] Inventor: Vaughn A. Nelson, Downers Grove, Ill.

[73] Assignee: International Harvester Company, Chicago, Ill.

[22] Filed: Jan. 5, 1970

[21] Appl. No.: 755

[52] U.S. Cl. .................................. 137/594, 285/1, 285/18, 285/86
[51] Int. Cl. ............................................. F16k 11/10
[58] Field of Search ............... 137/594, 595, 614.02, 614.03, 137/614.04, 596; 285/18, 302, 101, 1, 95, 86

[56] References Cited

UNITED STATES PATENTS

| | | | |
|---|---|---|---|
| 2,915,325 | 12/1959 | Foster | 285/319 X |
| 3,234,965 | 2/1966 | Anderson | 285/316 X |
| 3,435,848 | 4/1969 | Johnston | 285/86 X |
| 2,877,437 | 3/1959 | Flanagan | 285/316 UX |
| 2,359,648 | 10/1944 | Jones | 137/594 |
| 2,951,713 | 9/1960 | Hoffstrom | 137/614.03 |
| 3,291,442 | 12/1966 | Cranage | 285/101 X |
| 3,306,636 | 2/1967 | Hereth | 285/302 |
| 3,427,048 | 2/1969 | Brown | 285/18 |
| 3,454,047 | 7/1969 | Johnston | 137/614.04 |

*Primary Examiner*—Henry T. Klinksiek
*Attorney*—Floyd B. Harman

[57] ABSTRACT

A fluid line coupling including a male element, a female element, and fluid motor means associated with one of said elements which is adapted to be engaged with said other coupling element for hydraulically interlocking said coupling elements to complete a fluid circuit upon actuation of the motor means.

16 Claims, 3 Drawing Figures

Patented April 4, 1972

INVENTOR
VAUGHN A. NELSON

BY *Morey L. Baker*

ATT'Y.

3,653,405

FLUID LINE COUPLER

BACKGROUND OF THE INVENTION

This invention relates to a fluid coupling useful in interconnecting two fluid conduits together. More specifically this invention relates to a fluid coupling having fluid operated motor means for automatically interlocking said coupling elements and for completing a fluid circuit irregardless of the existence of fluid energy in either of said conduits.

Fluid couplings conventionally comprise a female element associated with one conduit and a male element associated with another conduit, each of said elements having a bore therethrough, with a valve therein for normally precluding the loss of fluid from either of said conduits but which act to unseat each other as the elements are manually interlocked and held in such position by detent means. For many purposes such couplings are satisfactory and their incorporation into a hydraulic circuit between a source of fluid energy and a motor presents no problems. However, difficulties may arise in the use of such couplers if the valve of one of the coupling elements is subject to fluid pressure forcing same to its closed position. A subsequent attempt to engage the other element so as to complete the conduit and open the valve against this pressure may require undesireable manual effort.

Once the elements are coupled, satisfactory quick release or uncoupling means are also desirable. Similarly if excessive axial forces are imposed upon the conduits, breakaway capabilities of the coupling are essential if rupture of the conduit is to be prevented.

SUMMARY OF THE INVENTION

In order to provide a coupler which will cope with these identified and other difficulties, my invention utilizes a fluid motor associated with one of said coupling elements adapted for initial manual engagement with the other coupling element, with subsequent interlocking being effected automatically through fluid energy existing in either of the conduits. Additionally quick release means are provided for hydraulically permitting disengagement of the locked coupling elements and breakaway capabilities are proposed for permitting uncoupling any time an axial tensile force is applied to said coupling elements tending to separate them.

Accordingly it is an object of my invention to provide a fluid coupling having fluid motor means for coupling the individual elements thereof together. Similarly the combination of quick release means in association with said motor means and said coupling elements is another object of my invention. Similarly specific provision is made for the incorporation of a breakaway structure whereby the coupling elements automatically disconnect should excessive tensile forces act on the conduits. Finally, it is an object of this invention to provide a hydraulic coupling which is economical to manufacture and of quite simple construction.

DESCRIPTION OF THE DRAWINGS

These as well as other objects of the instant invention will become more apparent through a consideration of the drawings in which.

DETAIL DESCRIPTION

Figure 2:
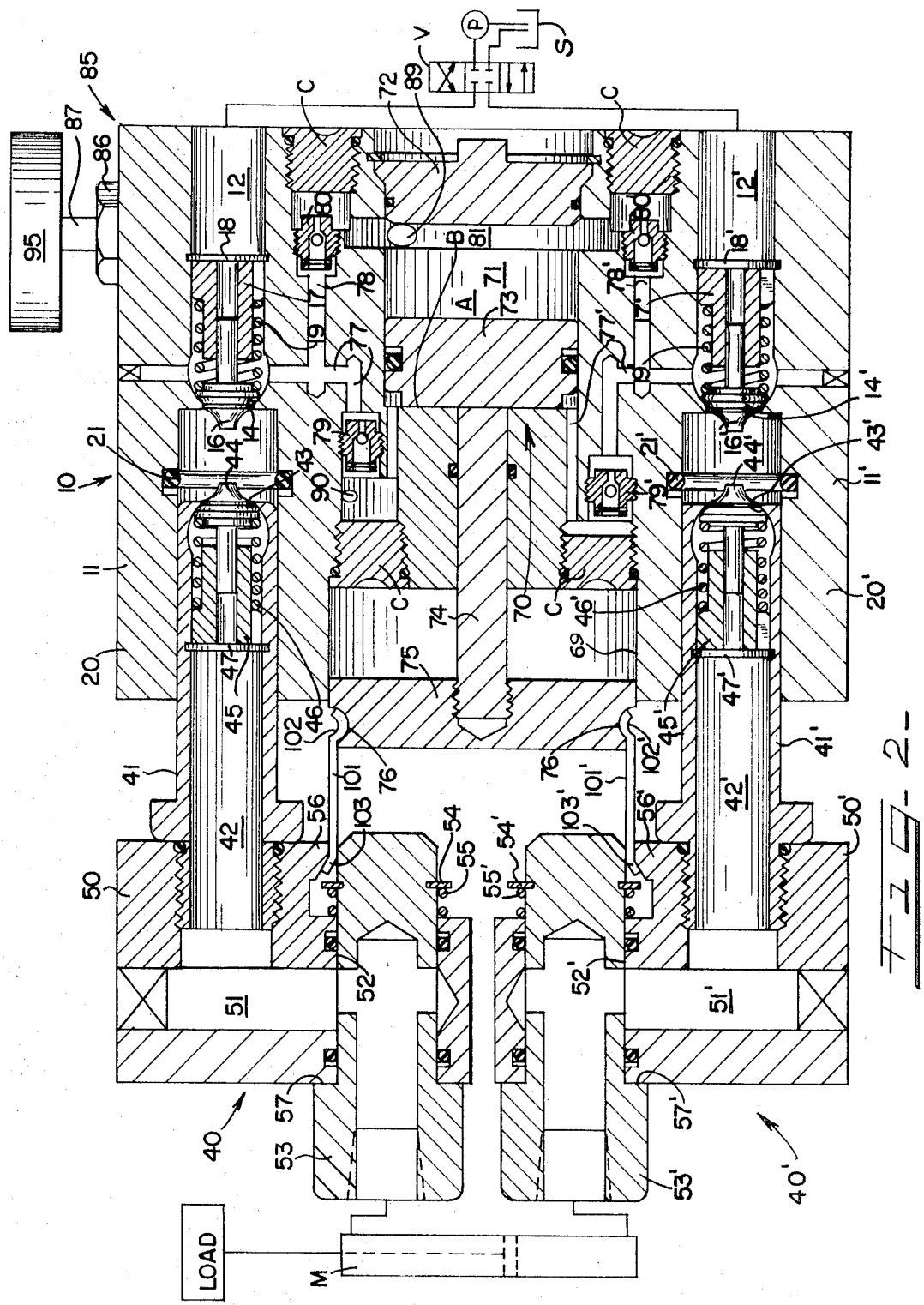
FIG. 2 is a sectional view of both coupling elements taken through the longitudinal center line 2—2 of the coupling and discloses the hydraulic motor means in its extended position prior to actuation.

Although my invention may be incorporated into a single fluid line coupling, a preferred embodiment includes the combination of two fluid line couplings associated with the hydraulic engaging means and a quick detaching means. Such a dual coupling is desirable when (as illustrated in FIG. 2) fluid energy is to be directed from a pump P through a directional flow control valve V and a coupling to one end of a double acting hydraulic motor M, with fluid returning from the other side of the double acting hydraulic motor through an other coupling, the flow control valve and back to a sump S. Thus FIG. 2 discloses a female portion or forward section 10 having two female coupling elements 11, 11' and two male elements 40, 40' to permit the flow circuitry described. (Inasmuch as each of the male and female elements are identical, an integer will be used to denote the upper coupling element while an integer with a prime mark will be utilized to denote the lower coupling element).

The female or forward portion 10 of my embodiment houses female elements 11, 11' each having a bore 12 or 12' therein and adapted by appropriate fittings (not shown) for alternatively receiving fluid flow from a pump P for directing same to one end of the hydraulic motor M, and receiving flow from the opposite end of the motor to return same to a Sump S. Disposed within each of these bores is a valve 16, 16' urged by a spring 19, 19' towards a seat 14, 14'. Valve guides 17, 17' held in place by snap rings 18, 18' additionally serve as a reaction member for the springs 19. 19'. These valves 16, 16' thus preclude the loss of hydraulic fluid from the system in the absence of engagement of male elements 40, 40' within sockets 20, 20' also formed within the female portion 10 of the coupling, coaxial with bores 12, 12'.

The male coupling elements 40, 40' utilizes fittings 41, 41' for insertion into the sockets 20, 20' to complete a circuit of two conduits. The fittings 41, 41' are provided with bores 42, 42' therethrough having valves 44, 44' engaging a seat 43, 43'. As disclosed in each of the female elements, the male fittings 41, 41' are also provided with snap rings 47, 47' for holding guides 45, 45' in place and for providing the reaction member for springs 46, 46' which urge valves 44 against their seats 43, 43'. Thus, it should be appreciated that when fittings 41,41' are fully engaged in sockets 20, 20' the poppets will engage and force one another off of their respective seats whereby fluid may freely flow between bores 12 and 42 as well as between bores 12' and 42'. Each of the male elements 40 and 40' are additionally provided with housings 50, 50' having an L-shaped bore 51, 51' therethrough, with the male fittings 41, 41' being threadably engaged therewith. Offset from the male fittings 41, 41' is an axial bore 52, 52' extending through said housing and adapted to slidably receive hose fitting or connectors 53, 53', said hose connectors having a cross drill as shown and a bored passageway leading to a hose. The connectors 53, 53' are held within the apertures 52, 52' by a shoulder 57, 57' on one side of the housing and a snap ring 54, 54' on the other side. As disclosed, the hose connectors 53, 53' are capable of limited axial reciprocation within the apertures 52, 52' for purposes hereafter explained. Springs 55, 55' interposed between the snap rings 54, 54' and the housings 50, 50' urge the connectors 53, 53' forwardly as viewed in the drawings whereby the shoulders 57, 57' on the connectors 53, 53' will normally abut the housings 50, 50'.

With reference to the discussion thus far, it should be apparent that a female or forward section 10 houses two female coupling elements 11, 11', having sockets therein 20, 20' for receiving male fittings 41,41' of the male elements 40, 40'. In order to fully engage the male portion within the female portions, and to unseat the valves 16, 16' and 44, 44' hydraulic motor means are provided for automatically forcing the male coupling elements into the female coupling elements and interlocking the two elements to complete the hydraulic circuit. This motor means is designated generally by the numeral 70 and comprises an expansionable chamber 71 formed or bored into the female portion 10 and having a cap 72 closing the end of said bore, the cap being held in place by a snap ring as indicated. A reciprocable piston 73 divides chamber 71 into subchambers A and B and carries a piston rod 74 extending rearwardly of the female portion 10 through a smaller bore therethrough to reciprocate a retainer 75 upon actuation of the piston 73. The retainer means 75 is annular in structure and reciprocates within a bore 69 within said female portion 10 as disclosed.

Operation of the motor means is effectuated by directing fluid energy into chamber B against the piston 73 through motor conduits 77, 77' which originate forwardly of the valve seats 14, 14' and extend through check valves 79, 79' and thence to the rearward side of piston 73. Thus, it should be appreciated that when fluid pressure exists behind either of the poppet valves 16, 16', the piston 73 will be reciprocated forwardly drawing with it piston rod 74 and retainer 75. Maintaining the fluid within chamber B and precluding retraction of the piston 73, the check valves 79, 79' comprise annular inserts threaded into bores within the female section 10 which form a part of conduits 77, 77' and have a large bore extending partially therethrough, with a smaller bore completing the motor conduits 77, 77' and serving as a seat for the ball valve as shown. Pins then extend across the diameter of the annular insert to maintain the balls with said insert. As indicated in the drawings, the motor conduits comprise drilled passageways with the passageways mounting the insert being enlarged. As the passages extend toward the outer surfaces of the female housing 10 they are plugged either with a metal filling or with a cap C as indicated.

Thus the normal position of the piston 73 is forward and any time fluid energy exists behind either of the poppet valves 16, 16' said fluid energy will be delivered to the rear face of the piston 73 to urge same forwardly. In driving the piston 73 forwardly any fluid existing within the forward section of chamber 71 must be expelled therefrom, and return conduits 78, 78' are provided for such purposes. These conduits interconnect with motor conduits 77, 77' with an enlarged diameter 81 of chamber 71 and are also provided with check valves 80, 80' therein for insuring that fluid energy existing in motor conduits 77, 77' is always applied to the rearward face of the piston 73 since they preclude flow to the forward side of piston 73. Again these check valves 80, 80' comprise inserts threaded into an enlarged drilled passageway which intersects return conduit 78, 78' as well as drilled passageways extending into the chamber 71. Caps indicated at C close the drilled passageways which permit the insertion of the check valves 80, 80'. Thus, if fluid energy exists within bore 12, such will be directed through motor conduit 77 to chamber B while fluid may be exhausted from chamber A through check valve 80', return conduit 78' and into bore 12' which does not contain fluid energy.

Figure 1:
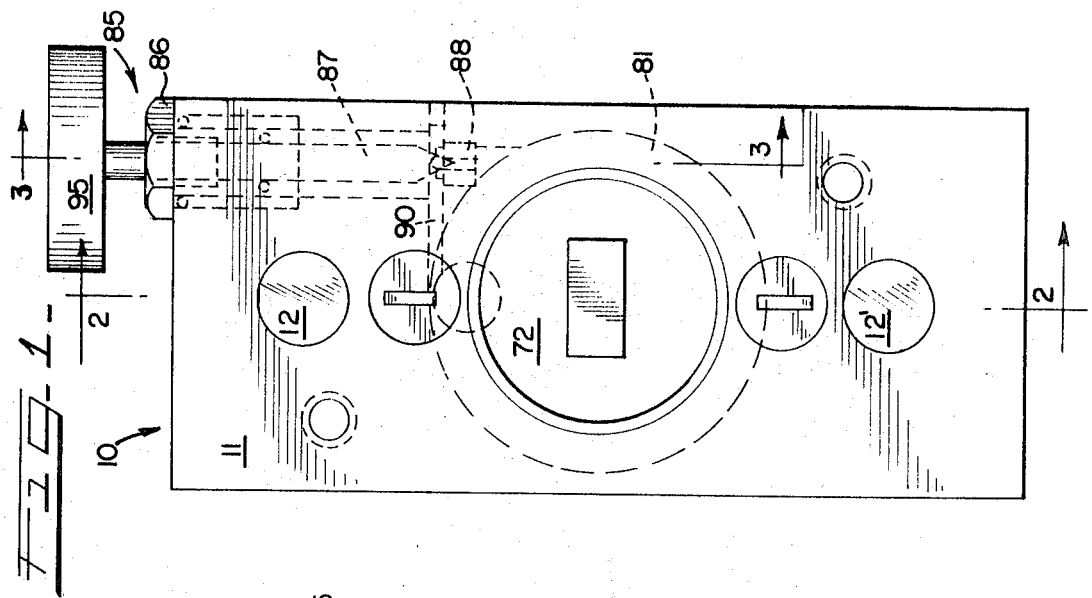
FIG. 1 is an elevational view of the end of the female coupling element.
Figure 3:
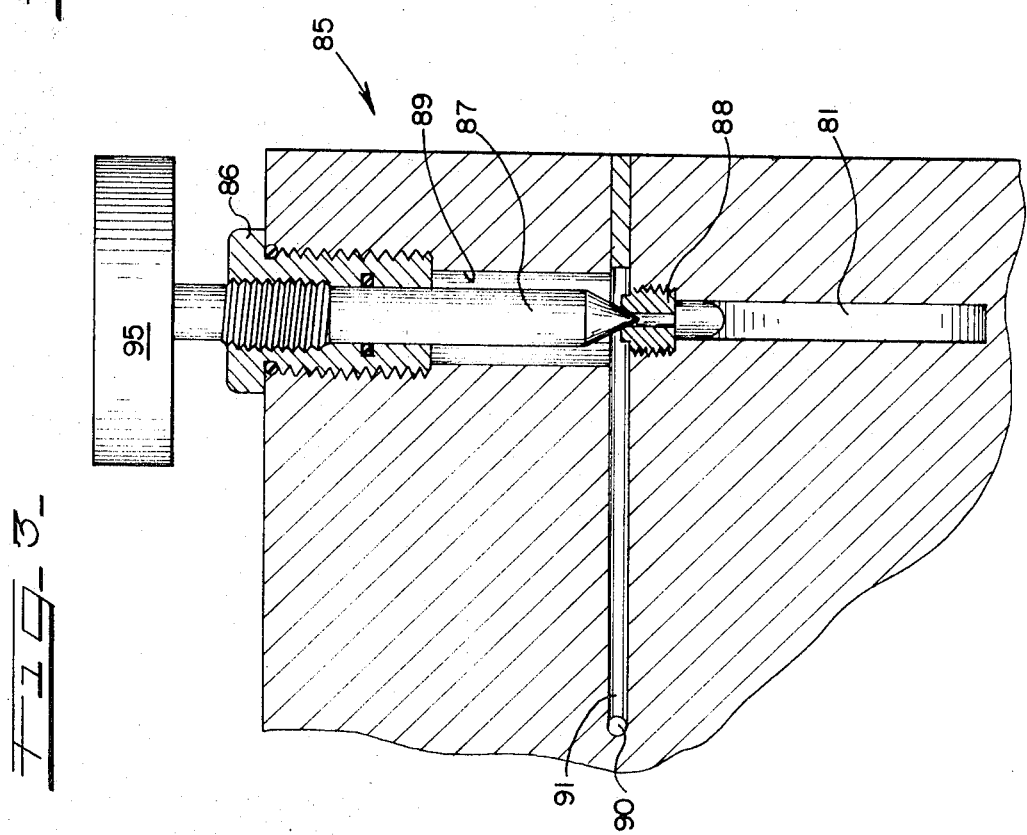
FIG. 3 is a sectional view of the release means taken through lines 3—3 of FIG. 1.

In order to provide for either manual or automatic retraction of the piston 73, release passageways 90 and 91 are provided within the female portion 20 so as to interconnect chambers A and B upon actuation of a valve means 85. As shown in FIG. 3 a passageway 90 is drilled at a right angle to motor conduit 77 so as to intersect same rearwardly of check valve 79 while passageway 91 extends generally parallel to the longitudinal centerline 2-2 of female portion 10 to interconnect passage 90 with a bore 89 which extends from the outside of the housing to an enlarged groove 81 of chamber 71. The valve means 85 comprises an insert 88 threaded into a reduced diameter of passage 89, a bore within the insert 88 providing a seat for the conical end of a spool 87. Below insert 88, a further reduced diameter of bore 89 intersects enlarged groove 81 of chamber 71. The spool 87 is threadly carried in bore 89 by a fitting 86 and is further provided with a knob 95 whereby rotation thereof causes seating and unseating of the valve means 85 by reciprocable movement. Thus, when valve means 85 is open, fluid may freely flow from one side of piston 73 to the other, and if manual effort is applied to the retainer 75, it may be withdrawn rearwardly with fluid flowing from chamber B to chamber A via bored passages 77, 90, 91, and 89. Alternatively if fluid pressure exists in either of the ports 12 or 12' it should be apparent that the piston will automatically retract itself to the position shown in the drawing because the pressure acts equally upon both sides of the piston, with a larger surface area on the forward side of the piston 73 permitting a larger net force to drive the piston rearwardly.

In order to effectively use this motor means to cause interlocking between the female and male elements of the coupler herein disclosed, attaching means 101, 101' in the form of a spring clip is effected to lock the male portions 40, 40' to the retainer 75. These attaching elements 101, 101' are in the form of spring clips having at one end a retaining flange 103, and at the other end an attaching flange 102. The attaching elements 101, 101' are normally carried by the male portions 40, 40' by an interlocking relationship between the forward extension of hose connectors 53, 53' and flanges 56, 56' formed on the male housing 50, 50'. A limited clearance between the flanges 56, 56' of the male housings, and the forward sections of the hose connectors 53, 53', is designed to lock the spring clips therein and carry them in a forwardly extending attitude as shown for engagement with groove 76, of retainer 75. As the piston 73 is moved forwardly by the motor means 70 these flanges 102, 102' will be locked within the circumferential groove 76 by the circumferential wall of the bore 69. Thus, it should be apparent that if the attaching means 101, 101' are placed within the circumferential groove 76, and if the valve means 85 is closed, fluid energy existing within either port 12 or 12' will cause the piston 73 to move forward, and the male and female elements of the coupling will be interlocked, fluid energy behind the piston 73 causing the poppet elements 16, 16' and 44, 44' to unseat each other and permit passage fluid between conduits 12 and 42 and 12' and 42'.

As previously indicated it is also desirable to provide in many couplings of the type herein described a breakaway feature whereby an axial force applied to the hydraulic hoses tending to separate the male from the female element, will be able to uncouple said elements to preclude that axial force from breaking the hydraulic hose. Such release means are herein provided due to the cooperation between the interengagement of the attaching means 101 with the male portions 40, 40'. Thus the hose connectors 53, 53' are permitted limited axial movement within the apertures 52, 52' of the male elements, such being spring-biased in the forward position by springs 55, 55'. From the structure already discussed it should be apparent that if this axial force is applied to the hose connectors 53, 53', that force may cause reciprocation of the connectors 53, 53' rearwardly against the bias of springs 55, 55' to permit the retainers 103, 103' to disengage themselves from the flanges 56, 56' and the male and female sections may separate without any distruction of the hydraulic hoses.

MODE OF OPERATION

With this previous discussion of the structural characteristics of my novel invention, the operation of the device is quite simple. Thus, the female elements 11, 11' may have their ports 12, and 12' interconnected with a four-way directional flow control valve V which is further connected to a source of fluid energy P while the male sections 40 and 40' may be connected with opposite ends of the double acting hydraulic motor M. To interlock the male and female elements and to obtain an operational hydraulic circuit, it becomes necessary only for the operator to insert the male fittings 41 and 41' into the sockets 20 and 20', and to engage the attaching flanges 102, 102' into the annular groove 76. Once such is accomplished, the operator merely closes valve means 85. Thus if fluid energy exists in either port 12 or 12', such will be directed to the rearward side of the piston 73 through the motor conduits 77 and 77' to drive the piston forward, with fluid in the forward section of chamber 71 being exhausted therefrom by either the return conduit 78 or 78' depending upon which of the bores 12 or 12' has no fluid energy. Alternatively if no fluid energy exists in either port 12 or 12', the operator need only actuate his directional flow control valve in either direction to deliver fluid to either of these ports, and the motor means 70 will reciprocate forwardly drawing the retainer 75 with it and urging the male sections 40 and 40' into the sockets 20 and 20' and cause each of the poppet valves to unseat one another.

Should the operator desire to uncouple the device, he may open the valve means 85, and insure that fluid is again directed to either port 12 or 12'. Due to the unequal surface areas on opposite sides of piston 73, such will be caused to reciprocate rearwardly due to the larger exposed surface area on the forward side. Alternatively, he may open valve 85 and manually withdraw male sections 50, 50'. Rearward reciprocation will cause or permit the poppets 16, 16' and 43, 43' to again seat themselves as indicated in the drawing, and the operator need only apply little manual effort to cause the attaching flanges 102, 102' to disassociate themselves with the grooves 76.

The breakaway structure in the form of the releasable interconnection of the male sections 40 and 40' with attaching means 101, 101', will preclude rupture of the hoses should an excessive axial force be imposed thereon due to the rearward reciprocation of connectors 53, 53' and the subsequent freeing of retaining flanges 103, 103'.

Thus it should become apparent that I have proposed a very unique and novel hydraulically actuated fluid line coupling. As disclosed, provision has been made for two couplings which are identical to one another and are ideally suited to operate a double acting hydraulic cylinder in which one coupling delivers fluid energy with the other coupling returning fluid to sump. However it should be very clear that my coupling may be utilized with a single male and female coupling element, and utilized to actuate or operate a single acting hydraulic ram or to deliver fluid energy and complete any fluid circuit. The hydraulic motor means may be used with or without the breakaway provisions herein proffered, or it may take other forms, that herein disclosed being by way of example only.

I claim:

1. A fluid line coupling comprising:
   1. a male coupling element having two fluid passages therethrough with first valve means in said passages for normally precluding fluid flow therethrough,
   2. a female coupling element having two fluid passages therethrough, with socket means towards one end of said fluid passage for receiving said male coupling element, said passages having second valve means therein normally precluding flow of fluid therethrough, and
   3. fluid actuated motor means connected to one of said coupling elements, and adapted to be attached with said other coupling element for causing engagement of said male element with said female element to open said first and second valve means when fluid pressure exists in a fluid passage with which the motor means is connected.

2. An apparatus as recited in claim 1 in which said motor means comprises:
   1. hydraulically actuated piston means reciprocable within a chamber, and
   2. a conduit interconnecting the chamber on each side of said piston means and the fluid passage for directing fluid energy against said piston to reciprocate for causing engagement of said coupling elements.

3. An apparatus as recited in claim 2 in which:
   1. valve means are interposed in said conduit means for equalizing the pressure on both sides of said piston.

4. An apparatus as recited in claim 1 in which:
   1. said valve means in each of said coupling elements are so positioned as to open each other upon insertion of said male member within said female member.

5. An apparatus as recited in claim 2 in which:
   1. breakaway means are provided for attaching said motor means with said other element for releasing said other element when a force is applied thereto.

6. A female coupling member for a fluid line coupling comprising:
   1. a housing having a fluid passage way therethrough, a valve member therein for normally precluding fluid flow therethrough, and a socket element for receiving a male coupling element, and
   2. fluid motor means carried by said housing, and adapted to engage a male coupling element, for drawing said male coupling element into said socket means to open said valve member upon delivery of fluid energy to said motor means.

7. An apparatus as recited in claim 6 in which said motor means comprises:
   1. a chamber within said female housing,
   2. a piston reciprocable within said housing, and
   3. conduit means interconnecting said fluid passage and said piston whereby fluid energy in said passage will cause reciprocation of said piston and engagement of a male member.

8. An apparatus as recited in claim 7 in which:
   1. fluid conduit means interconnect said chamber on opposite sides of said piston, and
   2. valve means are provided in said fluid conduit means for permitting free flow of fluid energy to at least one side of said piston whereby said piston may be withdrawn into a position for engagement with a male coupling element.

9. A fluid line coupling comprising:
   1. a first member having a fluid passage therein, first valve means in said fluid passage biased to a closed position, and socket means extending from said fluid passageway for receiving a second member,
   2. a second member adapted for engagement with said socket means and having a fluid passage therethrough, second valve means normally biased to a close position within said passageway,
   3. motor means carried by one of said members, and
   4. engaging means on said other member for engaging said motor means, said motor means and said engaging means adapted to cause engagement of said first member with said second member to open said first and second valve means upon actuation of said motor means.

10. An apparatus as recited in claim 9 in which said motor means comprises:
    1. a hydraulically actuated piston reciprocable within a chamber carried by the associated member, and
    2. conduit elements interconnecting said motor means and a fluid passageway for actuating said motor means and causing engagement of said elements when fluid energy exists in said fluid passageway.

11. An apparatus as recited in claim 10 in which:
    1. conduit means interconnect said chamber on opposite sides of said piston, and
    2. valve means are interposed in said conduit means for permitting fluid to flow from one side of said piston to the other side of said piston and permitting disengagement of said first member with said second member.

12. An apparatus as recited in claim 9 in which releasable means are carried by at least one of said engaging means and said other member for permitting disengagement thereof upon an axial force being applied to said other member.

13. A dual fluid line coupling comprising:
    1. a first coupling element including housing having two fluid passages therein, first valve means resiliently biased to a closed position within said passageways, and socket means within said housing for receiving a second coupling element.
    2. a second coupling element having a fluid passage therein and adapted to engage said socket means in said first coupling element, and having a second valve means normally biased to a closed position, and
    3. motor means carried by said first housing and operable by fluid energy in either of said passageways for causing engagement of said second member with said first member.

14. An apparatus as recited in claim 13 in which said motor means comprises:
    1. hydraulically actuated piston means reciprocable within a chamber, and 2. a conduit interconnecting the chamber on each side of said piston means and the fluid passage for directing fluid energy against said piston means to reciprocate the latter means for causing engagement of said coupling elements.;

15. An apparatus as recited in claim 14 in which:
   1. third valve means are interposed in said conduit means for equalizing the pressure on both sides of said piston.

16. A male coupling member adapted for engagement with a female coupling member having a fluid motor means to form a fluid line coupling, said male member comprising:
   1. a housing including a hose connector member and having a fluid passage therethrough;
   2. valve means within said fluid passage normally precluding fluid flow therethrough in the uncoupled position;
   3. said hose connector member being axially movable relative to said housing between inward and outward position;
   4. bias means engaging said hose connector member for urging the latter toward its inward position;
   5. attaching means capable of interconnection with said fluid motor; and
   6. detent means normally retaining said attaching means between said hose connector member and said housing when said hose connector member is in its inward position and permitting said attaching means to separate from said housing when said hose connector member is forced to its outward position.

\* \* \* \* \*